(12) United States Patent
Biddlestone et al.

(10) Patent No.: US 12,643,239 B2
(45) Date of Patent: Jun. 2, 2026

(54) COMPLIANCE AND PROTECTION SYSTEM FOR ROBOTIC ARM

(71) Applicant: isee, Cambridge, MA (US)

(72) Inventors: Scott Biddlestone, Cambridge, MA (US); Wilko Schwarting, Cambridge, MA (US); Gregory James Paraskos, Medford, MA (US)

(73) Assignee: isee, Cambridge, MA (US)

( * ) Notice: Subject to any disclaimer, the term of this patent is extended or adjusted under 35 U.S.C. 154(b) by 119 days.

(21) Appl. No.: 18/431,658

(22) Filed: Feb. 2, 2024

(65) Prior Publication Data

US 2025/0249591 A1     Aug. 7, 2025

(51) Int. Cl.
B25J 9/16 (2006.01)
B25J 9/00 (2006.01)

(52) U.S. Cl.
CPC ........... B25J 9/1697 (2013.01); B25J 9/0009 (2013.01)

(58) Field of Classification Search
CPC .............................. B25J 9/1697; B25J 9/0009
USPC ........................................................ 700/259
See application file for complete search history.

(56) References Cited

U.S. PATENT DOCUMENTS

| | | | | |
|---|---|---|---|---|
| 12,059,766 B2 * | 8/2024 | Jeong | .................. | B23Q 3/15713 |
| 12,202,128 B1 * | 1/2025 | Colantonio | .......... | B25J 15/0683 |
| 2020/0017317 A1 * | 1/2020 | Yap | ......................... | G06Q 10/08 |

| | | | | |
|---|---|---|---|---|
| 2020/0113167 A1 * | 4/2020 | Bouten | ................. | A01C 23/008 |
| 2021/0380182 A1 | 12/2021 | DeLizo et al. | | |
| 2023/0090757 A1 * | 3/2023 | Chen | ...................... | G06T 7/0008 |
| | | | | 382/103 |
| 2024/0043075 A1 * | 2/2024 | Johannes | ................ | B25J 9/1679 |
| 2024/0075778 A1 * | 3/2024 | Lacaze | ..................... | B60D 1/62 |

FOREIGN PATENT DOCUMENTS

| | | |
|---|---|---|
| WO | 2022051329 A1 | 3/2022 |
| WO | 2023212044 A1 | 11/2023 |

OTHER PUBLICATIONS

Doria et al, "Analysis of the Compliance Properties of an Industrial Robot with the Mozzi Axis Approach," robotics 2019, 8 (3), 80 (19 pages).
Qin et al., "Design and Analysis of a Compliant End-Effector for Robotic Polishing Using Flexible Beams," Actuators 2022, 11, 284. (11 pages).
UCC Universal Compliance Compensator, ATI Industrial Automation, https://www.ati-ia.com/products/compliance/Compensators_UCC.aspx <https://protect-us.mimecast.com/s/5qK4CVO5mRUxMDroUzDpiX?domain=ati-ia.com>, retrieved from the internet on May 1, 2024.
Video Library: ATI Industrial Automation—Video Library, <https://www.ati-ia.com/Library/video_listing.aspx?zone=6>, retrieved from the internet on May 1, 2024.

(Continued)

*Primary Examiner* — Kira Nguyen
(74) *Attorney, Agent, or Firm* — Lando & Anastasi, LLP

(57) ABSTRACT

A system for autonomously coupling a tractor and a trailer is presented with a tool changer having a first part and a second part, the second part configured to detachably couple to the first part; a chassis coupled to the first part; an end of arm tooling (EOT) coupled to the second part; a compliance mechanism coupled between the chassis and the first part, the compliance mechanism being configured to allow relative displacement of the EOT with respect to the chassis.

19 Claims, 12 Drawing Sheets

(56)          References Cited

OTHER PUBLICATIONS

Video: ATI Tool Changers and Collision Sensors used in Lab Automation, <https://www.youtube.com/watch?v=XIJLVGRbrOk &embeds_referring_euri=https%3A%2F%2Fwww.ati-ia.com%2F &source_ve_path=Mjg2NjY&feature=emb_logo>, retrieved from the internet on May 1, 2024.
Video: ATI Universal Compliance Compensator (UCC), <https://www.youtube.com/watch?v=LgexbWgu9pl>, retrieved from the internet on May 1, 2024.
Video: RCC Compensator demonstration, <https://www.youtube.com/watch?v=roXG3rqu5Fw&t=2s> retrieved from the internet on May 1, 2024.
Partial European Search Report from corresponding European Application No. 25154828.5 dated Jul. 24, 2025.

\* cited by examiner

1000

1102

1104

1106

100

1108

1100

COMPLIANCE AND PROTECTION SYSTEM FOR ROBOTIC ARM

BACKGROUND

1. Field of the Disclosure

At least one example in accordance with the present disclosure relates generally to automated coupling systems for gladhand couplers and other devices.

2. Discussion of Related Art

Gladhand couplers are used to seal and connect pneumatic connections on vehicles, e.g., airbrakes on tractor-trailers, brakes on trains, and on other types of fluid (liquid or gas) control systems or transmission systems.

SUMMARY

According to at least one aspect of the present disclosure a system for autonomously coupling a tractor and a trailer is presented, the system comprising: a tool changer having a first part and a second part, the second part configured to detachably couple to the first part; a chassis coupled to the first part; an end of arm tooling (EOT) coupled to the second part; a compliance mechanism coupled between the chassis and the first part, the compliance mechanism being configured to allow relative displacement of the EOT with respect to the chassis.

In some examples, the system further comprises a robotic arm coupled to the chassis, the robotic arm being configured to be coupled to a vehicle. In some examples, the compliance mechanism includes a mechanical linkage and a biasing mechanism, the biasing mechanism configured to apply a restoring force in a direction that opposes the relative displacement of the EOT with respect to the chassis. In some examples, the restoring force is approximately a linear function of the relative displacement. In some examples, the biasing mechanism is a spring. In some examples, the biasing mechanism is coupled to the chassis. In some examples, the relative displacement permitted by the compliance mechanism is in a first translational degree of freedom. In some examples, the compliance mechanism constrains the relative displacement in at least one translational degree of freedom other than the first translational degree of freedom, or constrains the relative displacement in at least one rotational degree of freedom. In some examples, the system further comprises at least one mechanical stop configured to limit the relative displacement of at least one part of the compliance mechanism. In some examples, the system further comprises at least one destructible coupling mechanism coupled between at least a portion of the EOT and at least a portion of the chassis, wherein the destructible coupling mechanism is configured to break when a force exceeding a threshold force is applied to the destructible coupling mechanism, wherein the threshold force is less than a first force level that would damage the EOT or is less than a second force level that would damage a robotic arm coupled to the chassis. In some examples, the system further comprises a backup connection mechanism coupled to the EOT and to the chassis and configured to maintain a connection between the EOT and the chassis when the destructible coupling mechanism is broken. In some examples, the system further comprises at least one fiducial coupled to the EOT. In some examples, the system further comprises at least one sensor configured to move in tandem with the chassis such that there is no relative motion between the at least one sensor and the chassis, the at least one sensor configured to sense the at least one fiducial. In some examples, the at least one sensor is a camera. In some examples, the system further comprises at least one controller, the at least one controller configured to receive input from the at least one sensor, the input reflecting a relative position of the at least one fiducial with respect to the chassis. In some examples, the at least one controller is further configured to adjust the movement of the EOT responsive to determining that the relative motion of the at least one fiducial exceeds a movement threshold. In some examples, the EOT is situated along a longitudinal axis offset at an angle greater than 0 degrees and less than 180 degrees relative to a longitudinal axis of the chassis. In some examples, the EOT includes a tool situated at an end of the EOT, the tool being configured to connect a trailer connection to a tractor connection.

According to at least one aspect of the present disclosure, a robotic arm assembly is presented, the assembly comprising: an end-of-arm tooling (EOT); an automated tool coupler having a first connector and a second connector configured to be selectively coupled together, the first connector coupled to the EOT and the second connector coupled to a compliance mechanism; and a chassis coupled to the compliance mechanism, the compliance mechanism being configured to allow relative displacement of the EOT with respect to the chassis.

In some examples, the EOT further includes: a EOT chassis with a first end and a second end; a tool coupled to the first end; a destructible coupling mechanism coupled between the second end and the first connector; a first fiducial coupled to the first end; and a second fiducial coupled to the EOT chassis between the first end and the second end. In some examples, the assembly further comprises a second chassis coupled to the second connector and to the compliance mechanism between the second connector and the compliance mechanism; and at least one sensor coupled to the chassis and configured such that a plane of a lens of the at least one sensor is parallel to a plane of the first fiducial.

According to at least one aspect of the present disclosure, a system for preventing a catastrophic failure of a robotic arm, the robotic arm including a first section and a second section, is presented, the system comprising: a breakaway mechanism configured to be coupled between the first section and the second section, the breakaway mechanism including a bracket coupled between the first section and the second section, the bracket being configured to break when a threshold force is applied to the second section; and an automated tool coupler coupled between the bracket and the second section, the automated tool coupler including a first connection coupled to the bracket and a second connection coupled to the second section.

According to at least one aspect of the present disclosure, a system for preventing a catastrophic failure of a robotic arm, the robotic arm including a first section and a second section, is presented, the system comprising: an automated tool coupler coupled between the first section and the second section, the automated tool coupler including a first connection coupled to the first section and a second connection coupled to the second section; at least one sensor configured to provide data corresponding to a position of a fiducial coupled to the first section; and at least one controller configured to receive the data, determine whether relative motion of the first section with respect to the second section has occurred, determine whether the relative motion exceeds a motion threshold, and responsive to determining that the relative motion exceeds a motion threshold, control the robotic arm to move.

BRIEF DESCRIPTION OF THE DRAWINGS

Various aspects of at least one embodiment are discussed below with reference to the accompanying figures, which are not intended to be drawn to scale. The figures are included to provide an illustration and a further understanding of the various aspects and embodiments, and are incorporated in and constitute a part of this specification, but are not intended as a definition of the limits of any particular embodiment. The drawings, together with the remainder of the specification, serve to explain principles and operations of the described and claimed aspects and embodiments. In the figures, each identical or nearly identical component that is illustrated in various figures is represented by a like numeral. For purposes of clarity, not every component may be labeled in every figure. In the figures:

DETAILED DESCRIPTION

Figure 1:
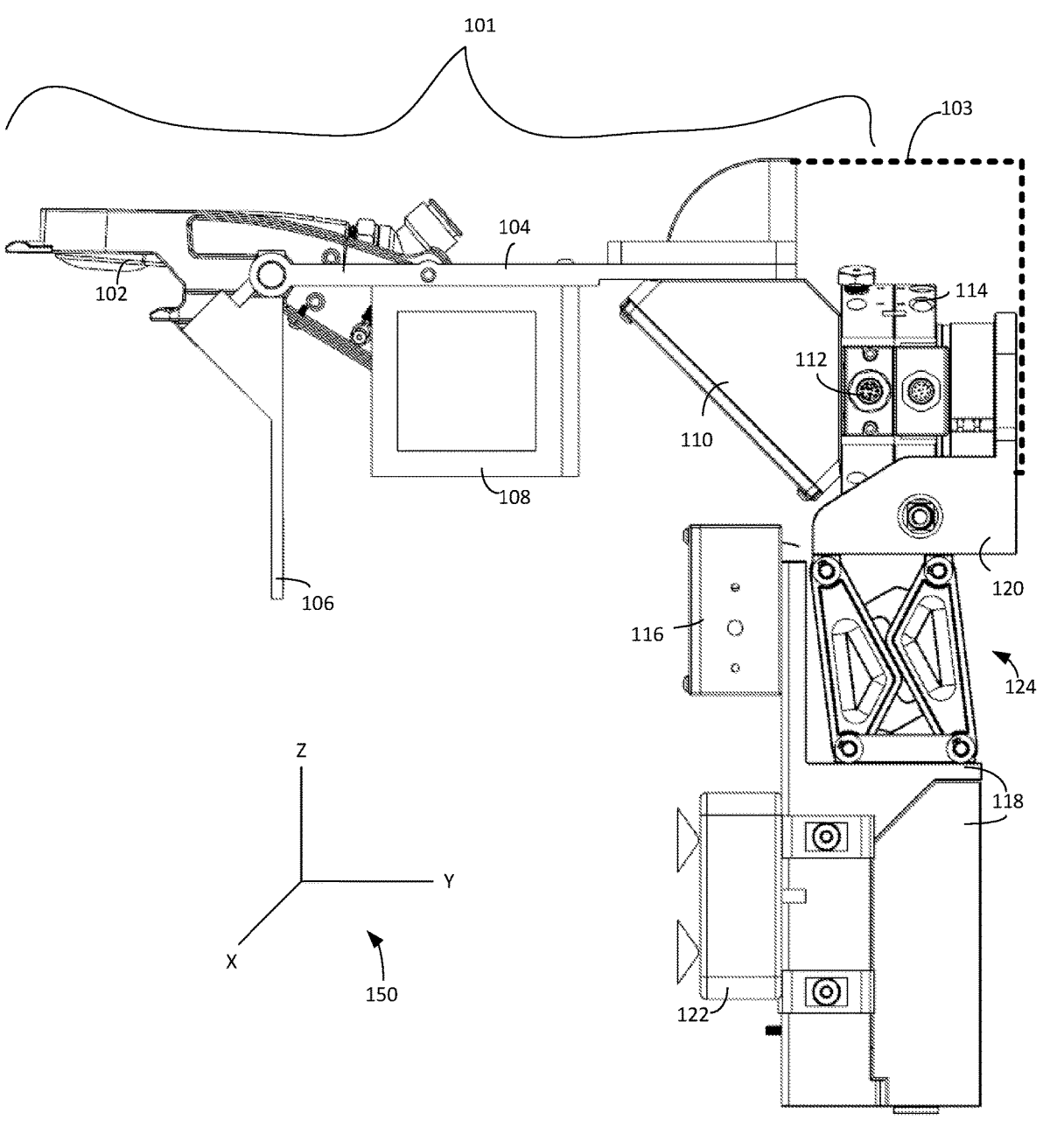
FIG. 1 illustrates a compliance and protection system according to an example.

Automated mechanisms, such as robotic arms, are increasingly used to perform complex tasks. In some cases, end-of-arm tooling ("EOT") is used by the automated mechanism for example the robotic arm, to interface with another object. U.S. patent application Ser. No. 17/568,185 to Paraskos, filed Jan. 4, 2022, titled "Gladhand Coupler Assembly," which is hereby incorporated by reference in its entirety for all purposes, describes a gladhand coupler assembly that can be integrated into an EOT, allowing the EOT to connect the gladhand coupler assembly to a corresponding gladhand coupler.

Aspects of this disclosure relate to improving the operation of automated mechanisms such as robotic arms and EOTs by providing additional compliance for said mechanisms and by providing a means to protect said mechanisms from damage.

Real-world conditions are rarely universally identical for every instance or variation on performing a task. In the context of a shipping yard ("yard") or similar place, various tractors (e.g., the automotive element of a tractor-trailer, such as a truck) may have different shapes, different layouts for the various connections and systems used to connect the tractor to the trailer (a trailer being, for example, a wheeled container configured to carry cargo, such as boxes, fluids, and so forth), and may have different obstructions (such as protrusions from the surface of the cab). Likewise, various trailers (e.g., semi-trailers, hazardous-material trailers, and so forth) may vary widely in design and shape, such that even relatively similar trailers may have different geometries or shapes where connections are located. For example, the obstructions of any two trailers may be substantially different in location, shape, and so forth, likewise, connections may be substantially different in location and, in some cases, shape, and so forth.

As a result, an EOT may require additional compliance to effectively operate with respect to varying types and designs of tractor and/or trailer.

At least one aspect of this disclosure relates to a compliance mechanism configured to provide additional compliance for an EOT and/or robotic arm or other automated mechanism. A compliance mechanism may have relatively higher compliance in at least a first degree of freedom of motion relative to other degrees of freedom of motion. In some examples, the compliance mechanisms may provide relative higher compliance and/or displacement in one or more directions or degrees of freedom of motion, but prevent displacement and/or offer relatively less compliance in other directions of degrees of freedom of motion.

Furthermore, EOTs may be susceptible to damage if enough force is applied. The compliance mechanism, providing additional compliance for the EOT, offers some protection from excess forces applied in line with the degrees of freedom of the compliance mechanism having relatively higher compliance by virtue of allowing the EOT to move relative to the rest of the automated mechanism. But the allowable displacement is typically finite, and thus, if the EOT is exposed to forces sufficient to move it to the limit of the range of motion provided by the compliance mechanism, the EOT, the compliance mechanism, and/or the robotic arm (or other automated mechanism to which the EOT is connected) may experience damage, stress, strain, or other undesirable forces. Likewise, if a force is applied in a direction for which compliance is not available, then similar damage, stress, strain, or undesirable forces may be experienced by the EOT, compliance mechanism, and/or robotic arm or other portions of the automated mechanism.

At least one aspect of this disclosure contemplates a destructible coupling mechanism (sometimes referred to hereafter as a "bracket") that is configured to plastically deform or fracture, when a force exceeding a threshold force is applied to it. Note that the term bracket is not intended to be limiting, and the destructible coupling mechanism is not limited merely to a bracket. Rather, a bracket is one possible form for the destructible coupling mechanism and is used for convenience and brevity hereafter.

FIG. 1 illustrates a compliance and protection system generally indicated at 100 ("system 100") in a first position according to an example. The system 100 includes a gladhand coupler assembly 102 ("gladhand coupler system 102") (for example, the gladhand of U.S. application Ser. No. 17/568,195), a first chassis 104, a first tag 106, a second tag 108, a bracket 110, a first connection mechanism 112 ("first connector 112"), a second connection mechanism 114 ("second connector 114"), a second chassis 118, a third chassis 120, a biasing mechanism 116, a at least one sensor 122, and a compliance mechanism, generally indicated at 124. FIG. 1 also includes a trace 150 including an X-axis, Y-axis, and Z-axis. In some examples, the system 100 may include an end-of-arm tooling 101 (sometimes referred to as "EOT 101"). The EOT 101 may include a subset of components of the system 100, including the gladhand coupler system 102, first tag 106, second tag 108, first chassis 104, bracket 110, and/or first connector 112. The first connector 112 and second connector 114 may collectively constitute and/or be elements of an automated tool coupler.

With reference to the axes of the trace 150, the compliance mechanism 124 (in this example) allows the gladhand coupler system 102 to move at least along a direction parallel to the Y-axis. In other words, the compliance mechanism has relatively higher compliance in the Y axis translational degree of freedom ("DOF"). Thus, if a force that has a component acting along the Y-axis is applied to the gladhand coupler system 102, the gladhand coupler system 102 will be able to move along the Y-axis in the direction of that force. In some examples, the compliance mechanism 124 may not offer compliance and/or displacement in some degrees of freedom of motion. For example, the compliance mechanism 124 may be designed to not allow displacement in a rotational direction around a given axis, or to allow displacement in translational directions along one or more axes. Thus, the compliance mechanism 124 may offer compliance and/or displacement in some direction and may prevent or restrict compliance and/or displacement in other directions.

The bracket 110 is configured to break when excessive force is applied to it (directly or indirectly). The force applied to the bracket 110 may have components that do not correspond to directions of movement available to the compliance mechanism 124. For example, if the compliance mechanism 124 is configured to move only along the Y-axis, the bracket 110 may be configured to break whether the excessive force applied to it has a Y-axis component or not.

In some examples, the bracket 110 may protect the robotic arm (e.g., robotic arm 1106 of FIG. 11) and/or the EOT 101. Either of the robotic arm or the EOT 101 may have characteristics unique to the model and/or design that indicate what a safe or operational range of forces would be when applied to the respective device. For example, the manufacturer of the robotic arm may provide a safe range of forces the robotic arm may be exposed to when operated. The bracket 110 may provide a safety factor of two or more (e.g., 2, 5, 10, and so forth). For example, the bracket 110 may be configured to break when experiencing one half, one fifth, one seventh, one tenth, and/or one hundredth, and so forth, of the rated forces for the robotic arm and/or EOT 101. In some examples, the amount of force applied to the bracket 110 may be measured or normalized in terms of a force hanging at the end of the EOT 101. In some examples, an excessive force may be a force greater than 10 pounds (e.g., 10, 20, 50, 60, 100 pounds).

Returning to discussion of the system 100 as a whole, the gladhand coupler system 102 is coupled to the first chassis 104, and may be pivotably coupled to the first chassis 104. The first tag 106 is coupled to the first chassis 104 at a first end of the first chassis 104. The second tag 108 is coupled to a middle portion of the first chassis 104. The bracket 110 is coupled to a second end of the first chassis 104 and to the first connector 112. The first connector 112 is removably coupled to the second connector 114, to allow chassis 104 and elements fixed to it, for example the EOT 101, to be attached to and detached from the third chassis 120. The second connector 114 is coupled to the third chassis 120. The third chassis 120 is coupled to the compliance mechanism 124. The compliance mechanism 124 is coupled to the second chassis 118. The biasing mechanism 116 is coupled to the second chassis 118. The at least one sensor 122 is coupled to the second chassis 118. The second chassis 118 is configured to be coupled to a robotic arm or other automated mechanism.

The gladhand coupler system 102 is a coupler that is configured to connect one or more pneumatic tubes, such as those used to operate airbrakes used by tractors and trailers. At least the body of the gladhand coupler system 102 may be made from materials having sufficient mechanical strength to withstand applied forces without plastic deformation, or exhibit relatively small elastic deformation, such as relatively strong metals (e.g., steel, die cast aluminum, and so forth). In some examples, the gladhand coupler system 102 may be replaced with a different kind of coupler. For example, the gladhand coupler system 102 may be replaced with a coupler for an electrical connection or any other type of connection. Thus, while a gladhand coupler system 102 is used herein, it should be understood that the gladhand coupler system 102 is only one example of a type of coupler that can be used as part of the EOT 101.

The first chassis 104 is configured to hold the gladhand coupler system 102 and to provide an anchor point for the first tag 106, second tag 108, and bracket 110. A longitudinal axis of the first chassis 104 may be orthogonal to a longitudinal axis of the second chassis 118. In some examples, a longitudinal axis of the first chassis 104 may be offset at an angle between 0 degrees and 90 degrees with respect to a longitudinal axis of the second chassis 118. The first chassis 104 may be made of high modulus materials, which may be magnesium, aluminum, steel, or other suitable metals or metal alloys. The first chassis 104 may also be coupled to a backup connection mechanism 103, for example a lanyard, chain, rubber band, rope, bungie cord or other type of cord, and so forth. The backup connection mechanism 103 may be further coupled to the robotic arm, the second chassis 118, the third chassis 120, or another device, such that should the bracket 110 break, the first chassis 104 and the elements coupled to it (e.g., the gladhand coupler system 102 and tags 106, 108) may be prevented from falling too far and hitting the ground. The backup connection mechanism therefore may prevent damage to the first chassis 104 and the elements coupled to the first chassis 104, and may prevent the first chassis 104 and elements coupled to the first chassis 104 from being separated from the rest of the system 100.

The first tag 106 and second tag 108 may contain symbols (e.g., fiducials) that can be identified by sensors or other types of detection devices, and used to determine the position and/or displacement of the compliance mechanism 124 and/or gladhand coupler system 102 relative to the sensor (e.g., the at least one sensor 122 or another sensor). In some examples, the tags 106, 108 may be April tags. In some examples, the tags 106, 108 may contain QR codes or similar symbols that can be easily identified by imaging processing software or hardware. In some examples, the tags 106, 108 may be orthogonal to one another, such that the plane of the largest face of the first tag 106 is orthogonal to the plane of the largest face of the second tag 108. The tags 106, 108 may also be offset from one another at other angles between 0 degrees and being orthogonal (e.g., 90 degrees). The tags 106, 108 may be made from a relatively lower modulus and lighter material like plastic. In some examples, making the tags 106, 108 from a lighter material may save weight. Furthermore, the tags 106, 108 may be configured to break when a force exceeding a respective threshold force is applied to them (the threshold for the tags 106, 108 not necessarily being equal to each other or equal to the threshold for the bracket 110). In some examples, the tags 106, 108 being relatively easier to break may help limit undesirable forces and/or torques from being applied to the first chassis 104 or gladhand coupler system 102, or other part of the system 100, when the tags 106, 108 come into contact with an object.

The bracket 110 Is a destructible component made from a relatively lower modulus material, such as a thermoplastic or thermoset polymeric material, and may be relatively lighter compared to a higher modulus material in at least some examples. The bracket 110 is configured to break when a force exceeding a threshold force is applied to the bracket 110, whether that force is applied directly or indirectly via, for example, the second chassis 104. The bracket 110 may have different force thresholds for fracture, for different directions of force. For example, the bracket 110 may have a first fracture threshold for forces applied along the X-axis, a second fracture threshold for forces applied along the Y-axis, and a third fracture threshold for forces applied along the Z-axis. The fracture thresholds may apply to torque as well as other types of forces. In some examples, if the bracket 110 experiences a force with a respective component exceeding a respective fracture threshold, the bracket 110 may plastically deform or break. For example, if a force is applied with components along the X, Y, and Z axes, and the Y component exceeds the Y-axis fracture threshold, and/or the X component exceeds the X-axis fracture threshold, and/or the Z component exceeds the Z-axis fracture threshold, then the bracket 110 may break. Regardless of the direction of the force, the bracket 110 may be configured such that when a fracture threshold is exceeded, the bracket 110 breaks into at least two pieces such that the first chassis 104 is no longer coupled via the bracket 110 to the first connector 112. That is, after the bracket 110 breaks, the first chassis 104, gladhand coupler system 102, and tags 106, 108 may only be coupled to another object via the backup connection mechanism.

In some examples, the bracket 110 may include force concentration features (e.g., stress or strain concentration features) designed to break when a force exceeding (and/or equaling) the fracture threshold is applied to the bracket 110. The use of force concentration features can allow the bracket 110 to break in a predictable manner (e.g., at areas where force concentration features are situated). Different force concentration features may have different fracture thresholds.

The first connector 112 and second connector 114 are configured to couple and decouple from each other (e.g., in response to an input such as an input from a robotic arm controller or other system controller). In some examples, the first connector 112 and the second connector 114 are portions (e.g., first and second portions) of an automated tool coupler and/or tool coupler. By decoupling the first connector 112 from the second connector 114, one or more of the first connector 112, gladhand coupler system 102, first chassis 104, first tag 106, second tag 108, and/or bracket 110 may be separated from one or more of the second connector 114, second chassis 118, third chassis 120, compliance mechanism 124, biasing mechanism 116, and/or at least one sensor 122, and a robotic arm. When a bracket 110 attached to the first connector 112 breaks, a new bracket 110 may be coupled to the first connector 112. The first connector 112 may be decoupled from the second connector 114 to allow for easier replacement of the bracket 110. The first connector 112 and second connector 114 may be configured to operate autonomously and/or automatically (e.g., without human actuation) in response to commands from a controller and/or the robotic arm, and so forth. In some examples, the compliance mechanism 124 is connected to the robotic-arm-side of the automated tool coupler (e.g., the first connector 112 and the second connector 114) in the system 100. In some examples where the compliance mechanism 124 is connected to the robotic-arm-side of the connectors 112, 114, the compliance mechanism 124 may be coupled to the second connector 114 but not to the first connector 112. Thus, when the EOT 101 is disconnected because the first connector 112 and the second connector 114 are decoupled from one another, the compliance mechanism may remain coupled to the second connector 114 (directly or indirectly) while being decoupled from the first connector 112. This reduces the mass of the elements coupled to the first connector 112.

In use, the gladhand coupler system may be attached to a glad hand on a trailer to which a tractor is connected. During transport of the trailer by the tractor, the first and second connectors of the automated tool coupler are disconnected from each other, leaving elements on the connector 112 side of the automated mechanism attached to the trailer gladhand. During transport, there may be significant mechanical vibration of the trailer. Reducing the mass of the elements attached to the trailer gladhand reduces the chances of the gladhand coupler becoming detached from the trailer glad hand, of being damaged or of damaging the trailer glad hand from forces arising due to the vibration.

The second chassis 118 and third chassis 120 are configured to provide a support framework for other elements of the system 100. In particular, the third chassis 120 is coupled to the second connector 114 and to the compliance mechanism 120, while the second chassis 118 is coupled to the other end of the compliance mechanism 124 and, in operation, may be coupled to a robotic arm. Thus, the third chassis 120 acts as an intermediary portion that bridges the gap between the bracket 110 and the compliance mechanism 124. In examples where the bracket 110 is omitted, the third chassis 120 acts as a bridge between the first chassis 104 and the compliance mechanism 124. The third chassis 120 may also include a connection configured to retain the backup connection mechanism, and thus may be coupled to the first chassis 104 (or gladhand coupler system 102) via more than just the bracket 110.

The biasing mechanism 116 provides a biasing force to the compliance mechanism 124. The biasing force biases the biasing mechanism 116 into a first position. The first position is a position where the compliance mechanism 124 cannot move any further in at least one direction. The movement of the compliance mechanism 124 may be limited by internal components of the compliance mechanism 124 itself, or because a part of the system 100 obstructs further movement of the compliance mechanism 124 in at least one direction (even if the compliance mechanism 124 may be capable of moving further in that at least one direction). For example, as illustrated in FIG. 1, the second chassis 118 may be configured to prevent the compliance mechanism 124 from moving along the Y-axis in one direction (in this example, in the direction towards the first tag 106). The biasing mechanism 116 may be a spring, such as a constant force or constant tension spring, and may be situated within the compliance mechanism 124 (as will be discussed later), or may be situated separate from the compliance mechanism 124.

The at least one sensor 122 may be configured to capture visual inputs including pictures or video of at least one tag 106, 108. In some examples, the tag captured is the first tag

106. In some examples, the at least one sensor 122 may include more than one sensor—for example, the at least one sensor 122 may be a camera such as a stereo camera that captures two image or video streams simultaneously, where the sensors are offset from one another by a predetermined distance. In some examples, the at least one sensor 122 may capture images or video of the scene and/or a tag (for example, the first tag 106) in some or all of the sensors the at least one sensor 122 is equipped with. The scene may be the area in front of the at least one sensor 122. For example, with reference to the trace 150, the scene may be the area within the field-of-view ("FOV") of the at least one sensor 122 along the Y-axis in the direction away from the at least one sensor 122 along the Y-axis and toward the first tag 106 (e.g., the at least one sensor 122 may capture images or video of items in the XZ plane). In some examples, the position of the first tag 106 in the frame of the captured images or video may be used to determine the compliance of the compliance mechanism 124 (that is, the position of the first tag 106 may be used to determine the position of the compliance mechanism 124 and therefore the displacement of the compliance mechanism 124 from the first position). In some examples, the at least one sensor 122 may have a highest sensing error in the depth translational degree of freedom (e.g., in a direction orthogonal to the plane of the lens or lenses of the at least one sensor 122, which in FIG. 1 may correspond to a direction parallel or along the Y-axis). In some examples, the range of motion provided by the compliance mechanism 124 (as discussed directly below) may be along a directional parallel to or substantially parallel to the depth translational degree of freedom.

In some examples, the at least one sensor 122 may be another type of sensor, such as a LiDAR sensor or other type of sensor. In such examples, the fiducials (e.g., the first tag 106 and/or second tag 108) may be a three-dimensional pattern detectable by the at least one sensor 122.

The compliance mechanism 124 provides a range of motion for certain components of the system 100 relative to other components of the system 100. As illustrated in FIG. 1, the compliance mechanism 124 allows at least the gladhand coupler system 102, first chassis 104, first tag 106, second tag 108, bracket 110, first connector 112, second connector 114, and/or third chassis 120 to move as a unit relative to the second chassis 118, at least one sensor 122, and/or biasing mechanism 116. The compliance mechanism 124 may offer additional range-of-motion in any direction, however, as illustrated in FIG. 1, the compliance mechanism 124 offers additional range-of-motion along the Y-axis.

The compliance mechanism 124 may be implemented in various ways, including with slide rails, linkages, torque bars, and so forth. The particular example of the compliance mechanism 124 shown in FIG. 1 shall be discussed in greater detail below. Note that, as illustrated, the compliance mechanism 124 does not move the third chassis 120 (relative to the second chassis 118) in a purely linear manner (e.g., along the Y-axis). Instead, the compliance mechanism 124 moves the third chassis 120 along the Y- and Z-axes, however motion along the Z-axis is relatively small compared to motion along the Y-axis (that is, the compliance mechanism 124 moves the third chassis 120 in an arc). However, the motion permitted by the compliance mechanism 124 may be substantially or effectively linear (e.g., effectively along the Y-axis only) because the movement along the Z-axis may so small as to be irrelevant or undetectable. Other implementations of the compliance mechanism 124 (e.g., a slide rail implementation) may move the third chassis 120 in a purely linear manner. Thus, the compliance mechanism 124 may move the third chassis 120 (and therefore the EOT 101) in only one direction or in more than one direction.

Figure 2:
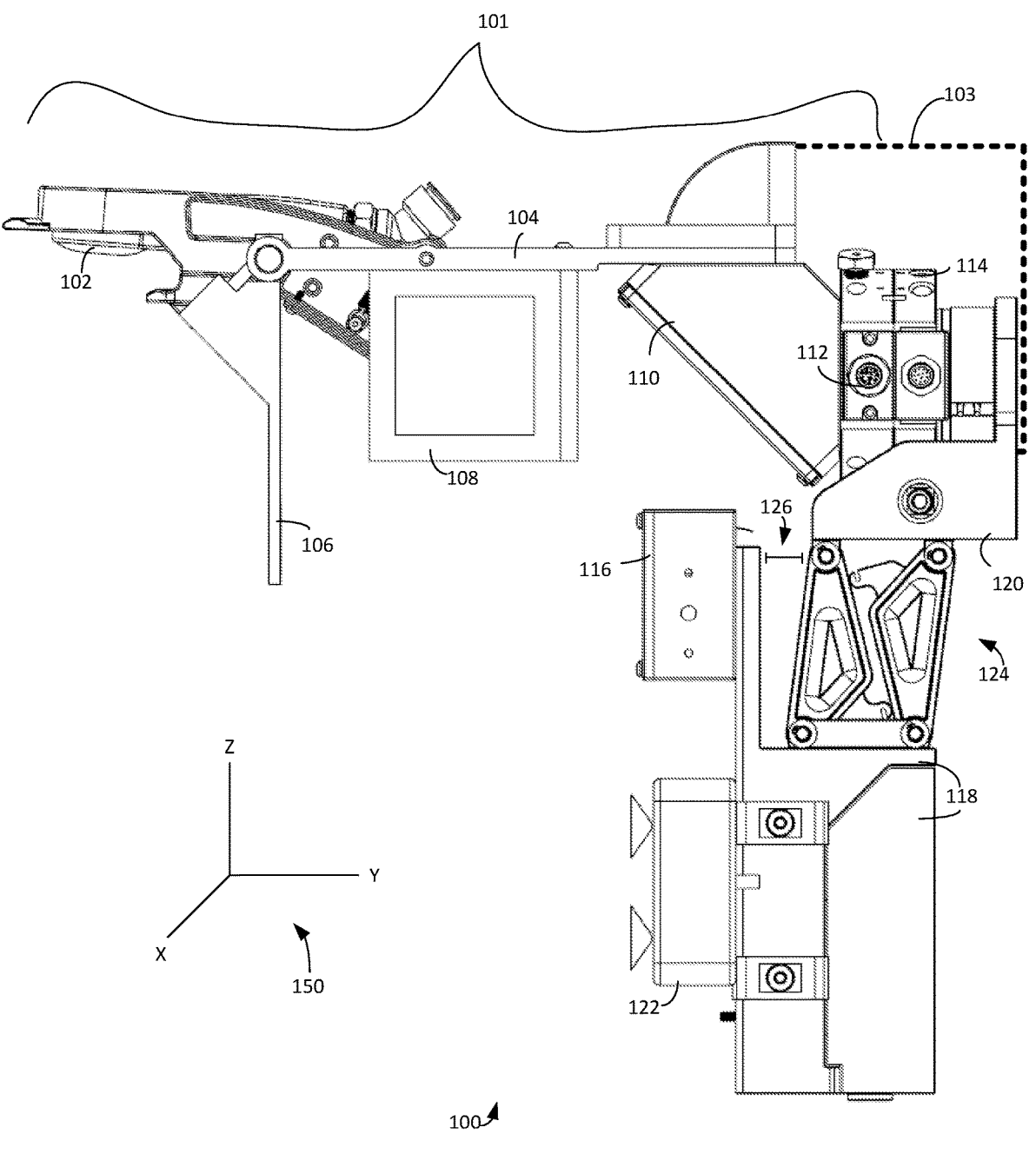
FIG. 2 illustrates a compliance and protection system according to an example.

FIG. 2 illustrates the system 100 with the compliance mechanism 124 in a second position, and thus the relative positions of the third chassis 118, connectors 112, 114, tags 106, 108, bracket 110, first chassis 104, and gladhand coupler system 102 have changed with respect to at least the second chassis 120 compared to FIG. 1, according to an example. Otherwise, the constituent parts of the system 100 shown in FIG. 2 are substantially similar to the system 100 shown in FIG. 1.

In the second position, the compliance mechanism 124 has shifted such that the portion of the compliance mechanism 124 coupled to the third chassis 120 is further from the second chassis 118 than the third chassis 120 was with respect to FIG. 1, along the Y-axis. A distance trace 126 has been added to FIG. 2 illustrating the approximate distance the portion of the compliance mechanism 124 coupled to the third chassis 120 (or, alternatively, the distance the third chassis 120) has moved. The distance trace 126 is not shown to scale. Thus, the distance illustrated by the distance trace 126 may be much greater or much less than it appears in FIG. 2. In at least some examples, the distance illustrated by the distance trace 126 may be at least 1 cm, but may be other values, such as those less than or greater than 1 cm, for example 10 mm, 20 mm, 50 mm, 100 mm, 2 cm, and so forth. The precise distance illustrated by the distance trace 126 may depend on a particular application or implementation of the system 100 (e.g., connecting a standard semi-trailer to a standard tractor may require less displacement in general compared to the heavy machinery context, such as connecting a heavy hauler to an excavator).

In some examples, the amount of compliance and/or displacement available via the compliance mechanism 124 may be adequate so that, between the displacement and/or force being sensed, a control signal may be sent to the robotic arm to prevent further movement of the system 100 before the end of the available travel provided by the compliance mechanism 124 is reached.

In some examples, the amount of compliance and/or displacement available via the compliance mechanism 124 may be adequate to allow the EOT 101 to be urged into a correct position if the EOT 101 starts out misaligned and/or slightly misaligned. The amount of time between sensing changes in displacement and/or compliance and reacting to urge the EOT 101 to correct its position may be sufficient to prevent damage to the EOT 101.

Figure 3:
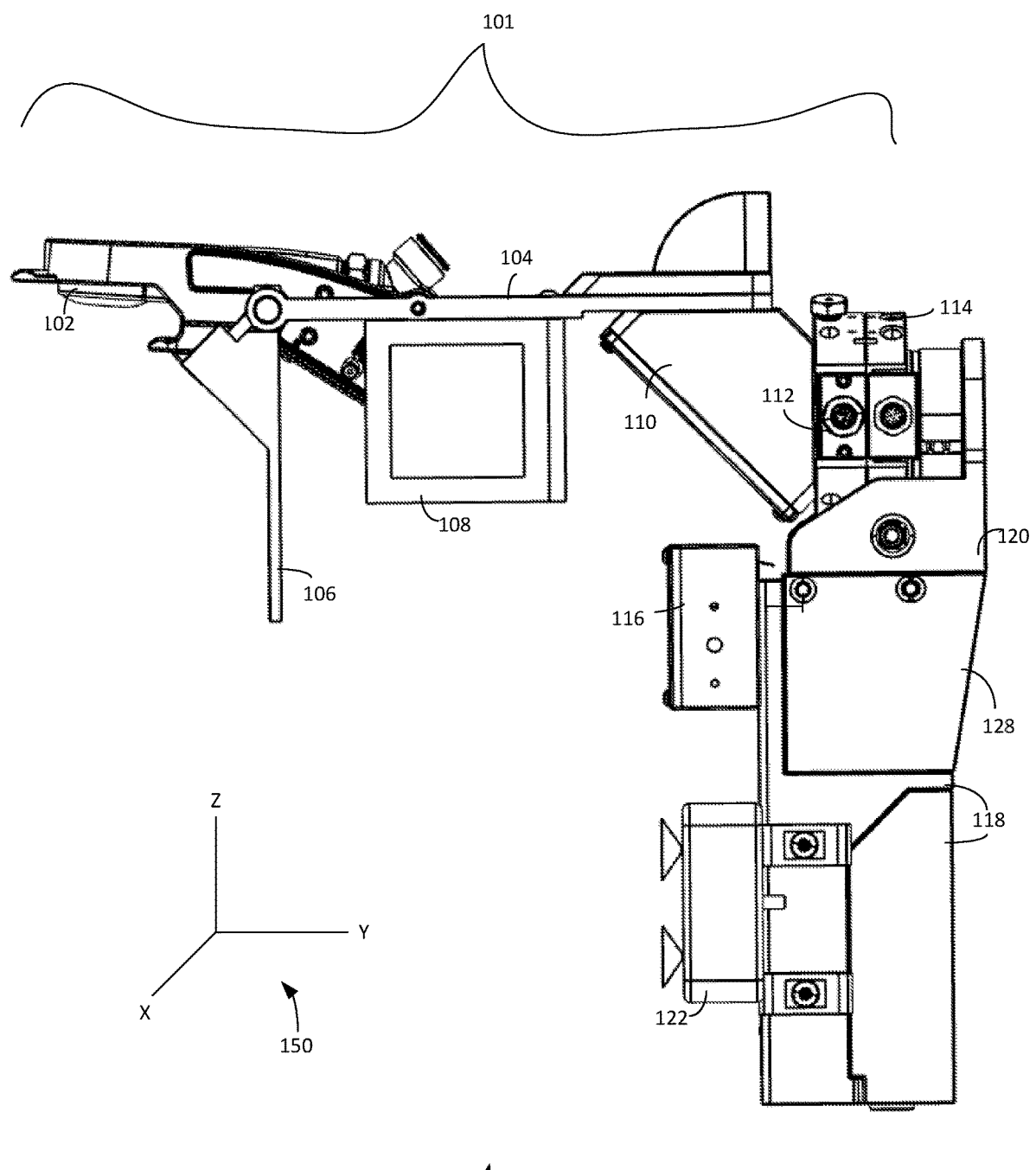
FIG. 3 illustrates a compliance and protection system according to an example.

FIG. 3 illustrates the system 100 according to an example. FIG. 3 is substantively similar to FIG. 1, except that a shroud 128 has been added. The shroud 128 may surround and protect the compliance mechanism 124, and may be coupled to the second chassis 118 and/or third chassis 120.

Figure 4:
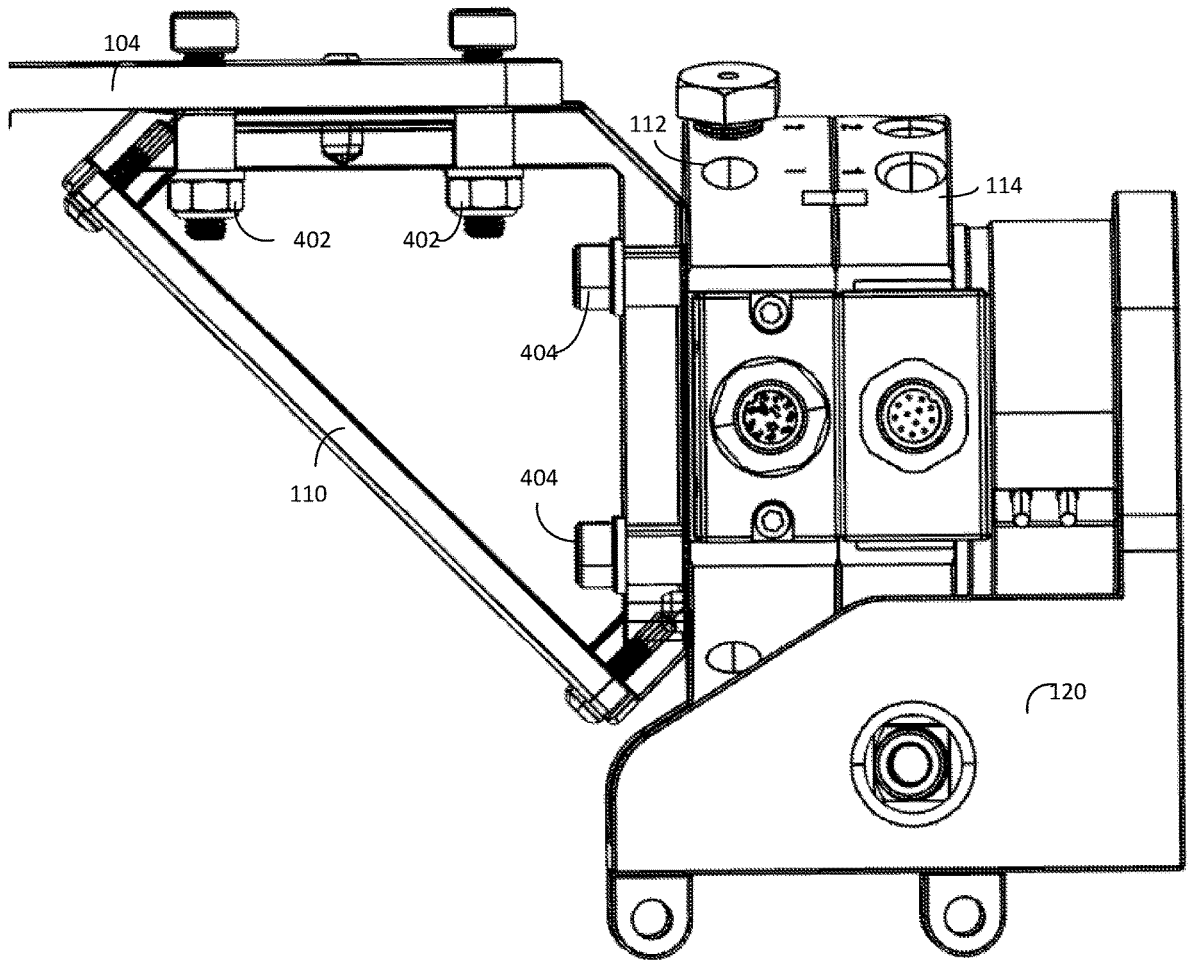
FIG. 4 illustrates an automated tool changer and bracket of a compliance and protection system according to an example.

FIG. 4 illustrates a portion of the system 100 including internal components of the bracket 110 according to an example. FIG. 4 includes the first chassis 104, third chassis 120, connectors 112, 114, and bracket 110. FIG. 4 also includes a first plurality of fasteners 402 ("first fasteners 402") and a second plurality of fasteners 404 ("second fasteners 404").

As illustrated, the bracket 110 is shown such that the edges of the bracket 110 are visible, but the center of the bracket 110 is not shown. This allows the fasteners 402, 404 to be seen within the bracket 110. In some examples, the bracket 110 may omit the center portions such that only the edges (e.g., the frame) of the bracket 110 are used.

The first fasteners 402 couple the first chassis 104 to the bracket 110. The first fasteners 402 are illustrated as nuts and bolts, however other types of fasteners may also be used. For example, screws, nails, hooks, buttons, clasps, adhesives, friction fit devices, and so forth. The second fasteners 404 couple the first connector 112 to the bracket 110. The second fasteners 404 are illustrated as nuts and bolts, however other types of fasteners may also be used. For example, screws, nails, hooks, buttons, clasps, adhesives, friction fit devices, and so forth.

In some examples, the fasteners 402, 404 may be self-destructive so that, when a threshold force is applied, the fasteners 402, 404 may break or shear. In some examples, the fasteners 402, 404 are not self-destructive, and are made of higher modulus materials such that the bracket 110 may break while the fasteners 402, 404 remain intact.

The fasteners 402, 404 may be replaceable, meaning that the fasteners 402, 404 may be removed and exchanged for new fasteners 402, 404, thereby allowing the bracket 110 to be replaced.

Figure 5:
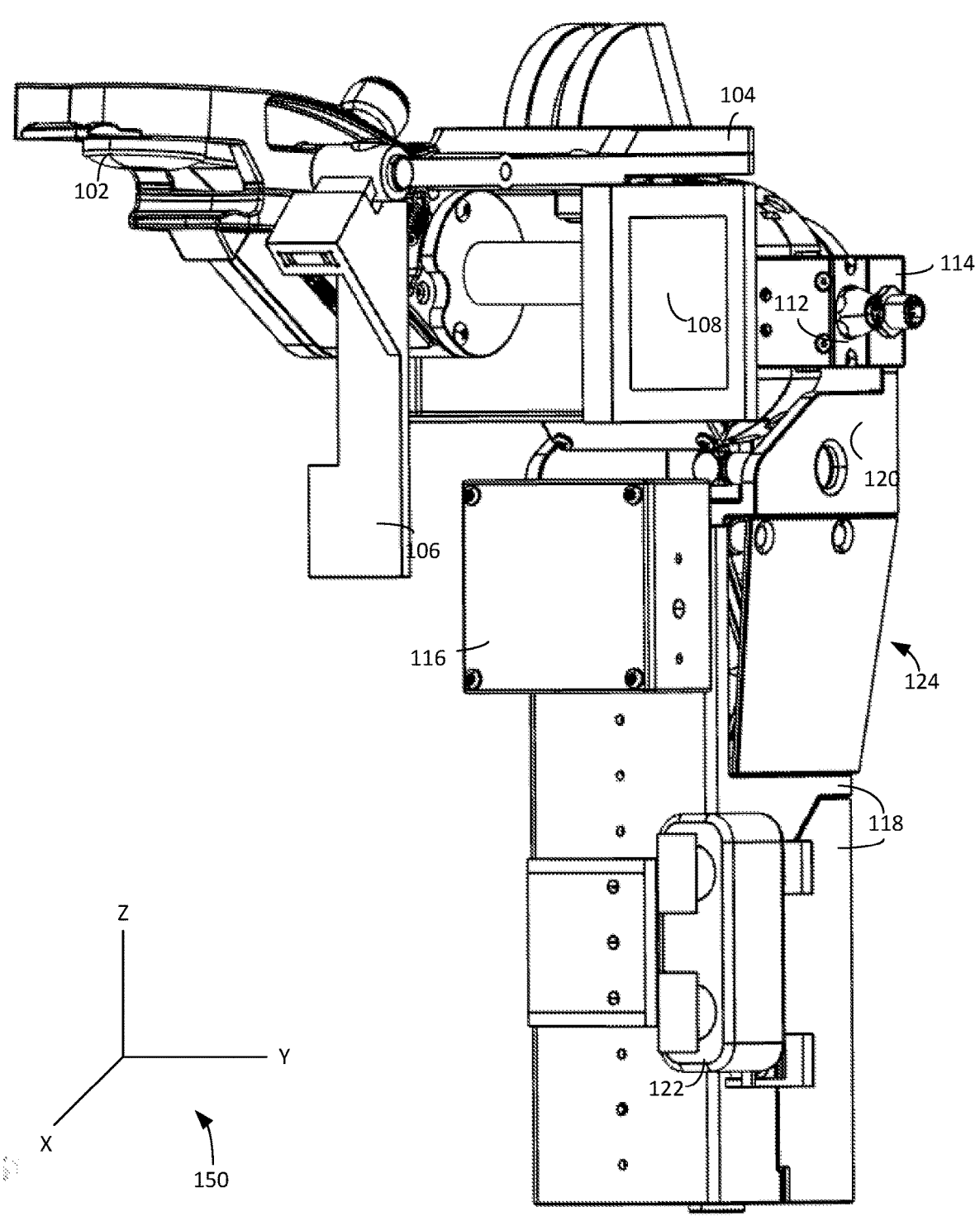
FIG. 5 illustrates a compliance and protection system according to an example.

FIG. 5 illustrates the system 100 of FIG. 1 from an oblique perspective according to an example. The bracket 110 is not visible in the perspective illustrated in FIG. 5 because the components of the second tag 108, first chassis 104, and gladhand coupler system 102 intervene between the point-of-view and the bracket 110.

Figure 6:
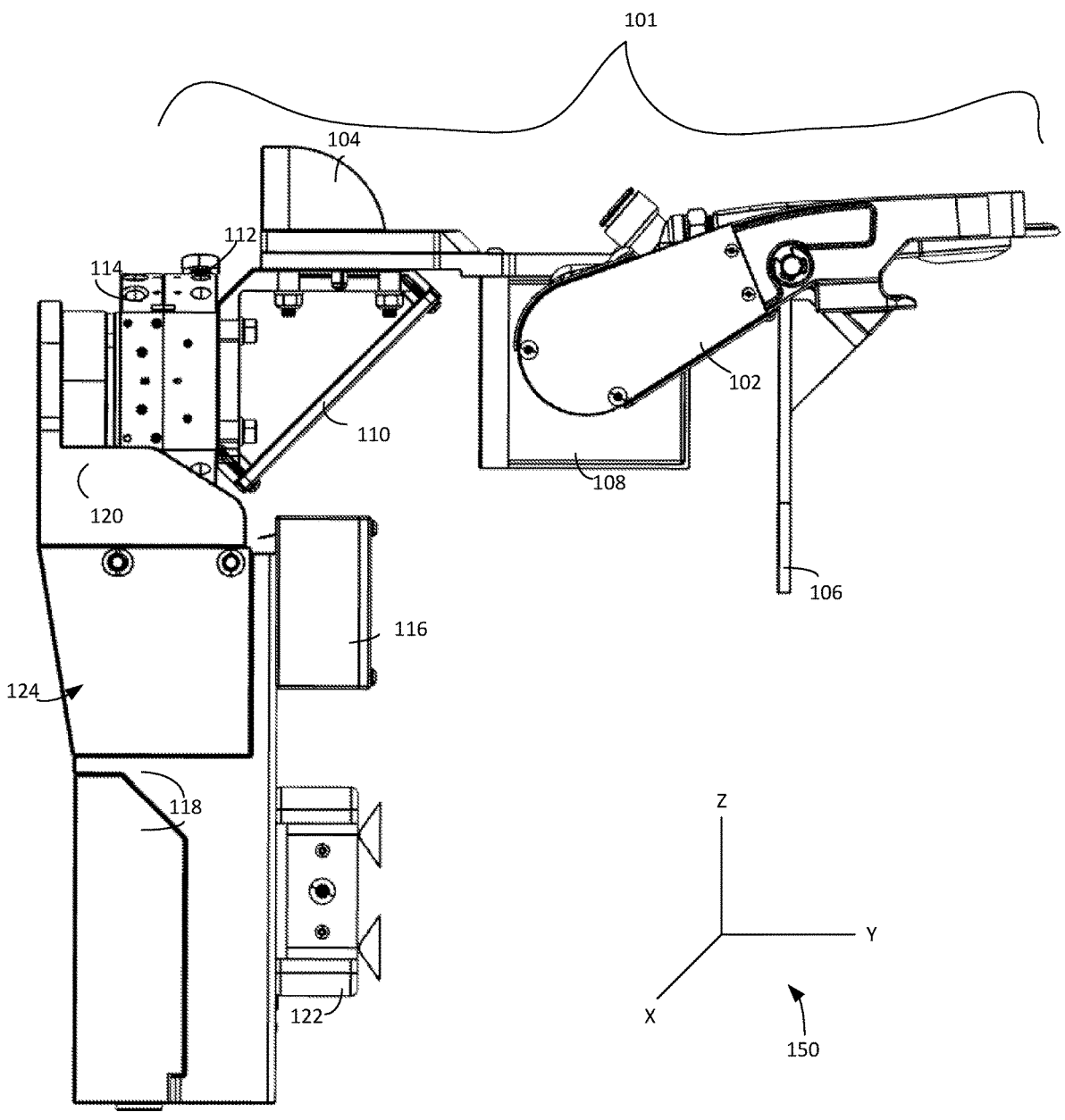
FIG. 6 illustrates a compliance and protection system according to an example.

FIG. 6 illustrates the system 100 of FIG. 1 according to an example. In FIG. 6, the system 100 is shown from the opposite side as shown in FIG. 1. In FIG. 6, the gladhand coupler system 102 has additional components that are visible in this perspective. The bracket 110 is shown in the view from FIG. 4 (but from the opposite side).

Figure 7:
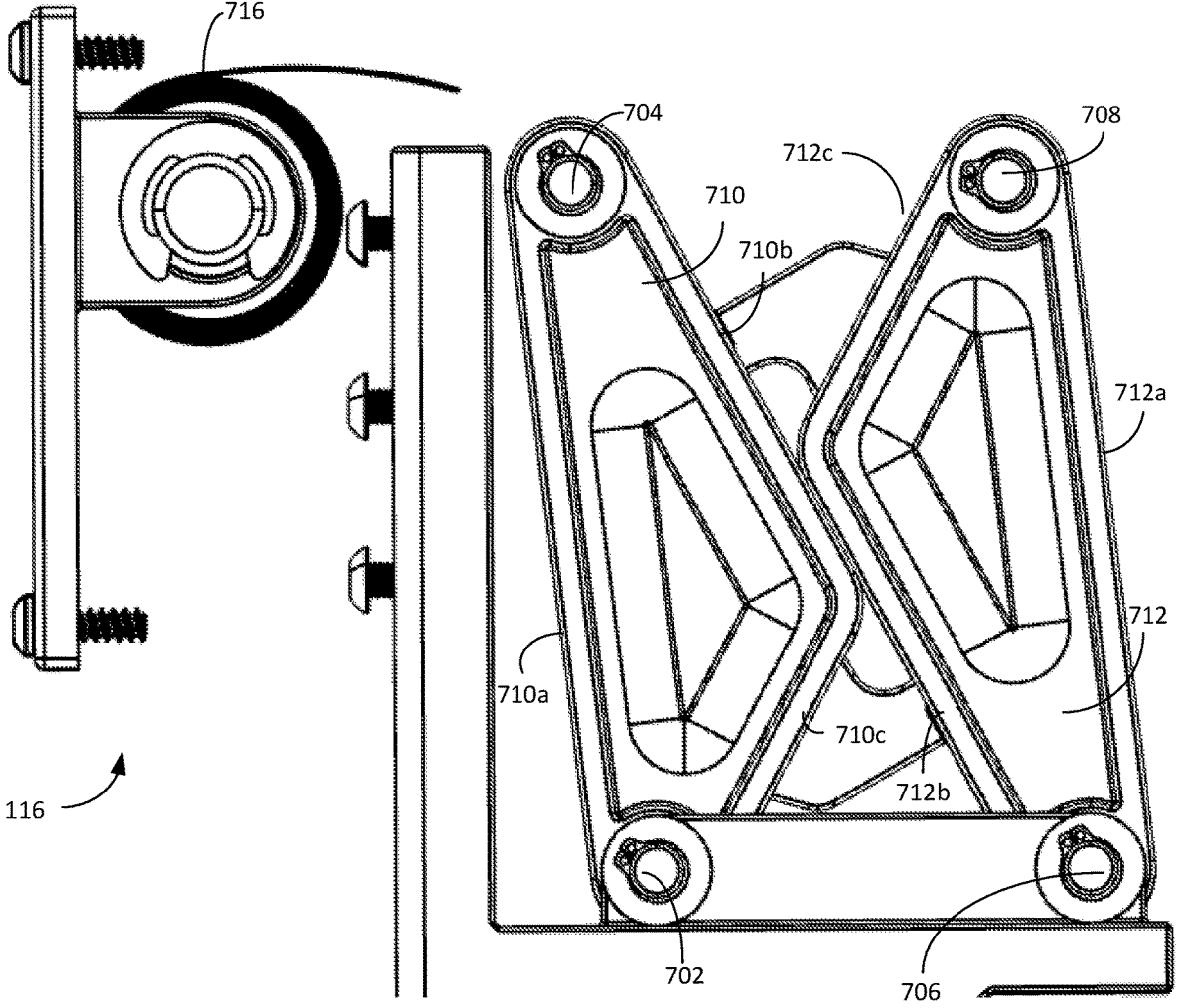
FIG. 7 illustrates a compliance mechanism according to an example.

FIG. 7 illustrates the compliance mechanism 124 according to an example. FIG. 7 also shows the biasing mechanism 116 according to an example. In FIG. 7, the biasing mechanism 116 includes a constant force spring 716 that is configured to bias the compliance mechanism 124 into the first position.

The compliance mechanism 124 includes a first rotational axis 702 ("first axle 702"), a second rotational axis 704 ("second axle 704"), a third rotational axis 706 ("third axle 706), a fourth rotational axis 708 ("fourth axle 708"), a first link 710, and a second link 712.

The first axle 702 is coupled to a first side of the first link 710. The second axle 704 is coupled to a second side of the first link 710. In some examples, the second axle 704 is coupled to a side of the first link 710 corresponding to the third chassis 120, and the first axle 702 is coupled to a side of the first link corresponding to the second chassis 118.

The third axle 706 is coupled to a first side of the second link 712. The fourth axle 708 is coupled to a second side of the second link 712. In some examples, the third axle 704 is coupled to a side of the second link 712 corresponding to the second chassis 118, and the fourth axle 708 is coupled to a side of the second link 712 corresponding to the third chassis 120.

The first axle 702 and second axle 704 pass through the first link 710 so that the first link 710 can change position when subjected to a force (e.g., the biasing force). As illustrated in FIG. 7, the first axle 720, which is positioned on an opposite end of the first link 710 from the second axle 704, provides two points of rotation for the first link 710, which allows the first link 710 to shift from the first position to the second position.

The third axle 706 and fourth axle 708 pass through the second link 712 so that the second link 712 can change position when subjected to a force. As illustrated, the third axle 706 and fourth axle 708 are positioned on opposite ends of the second link 712, thus providing the second link 712 with two points of rotation.

The linkages 710, 712 may have one or more sides. In FIG. 7, each linkage 710, 712 has three sides, including a long side, a short side, and a medium side. The first link 710 has a first long side 710a, a first medium side 710b, and a first short side 710c. The second link 712 has a second long side 712a, a second medium side 712b, and a second short side 712c. Other configurations are also possible.

The first long side 710a is positioned closest to the constant force spring 716, while the second long side 712a is the side positioned furthest from the constant force spring 716 (and is therefore the side furthest from the first long side 710a). The first medium side 710b is adjacent, at least in part, to the second axle 704, while the first short side 710c is adjacent, at least in part, to the first axle 702. The second medium side 712b is adjacent, at least in part, to the third axle 706, and the second short side 712c is adjacent, at least in part, to the fourth axle 708. During operation, the medium sides 710b, 712b may be adjacent, at least in part, to one another (for example, the medium sides 710b, 712b may be adjacent in the first position and second position). In some examples, the medium sides 710b, 712b may be adjacent throughout the operation of the compliance mechanism 124.

The constant force spring 716 may bias the compliance mechanism 124, including the first link 710 and/or second link 712 into the first position.

Figure 8:
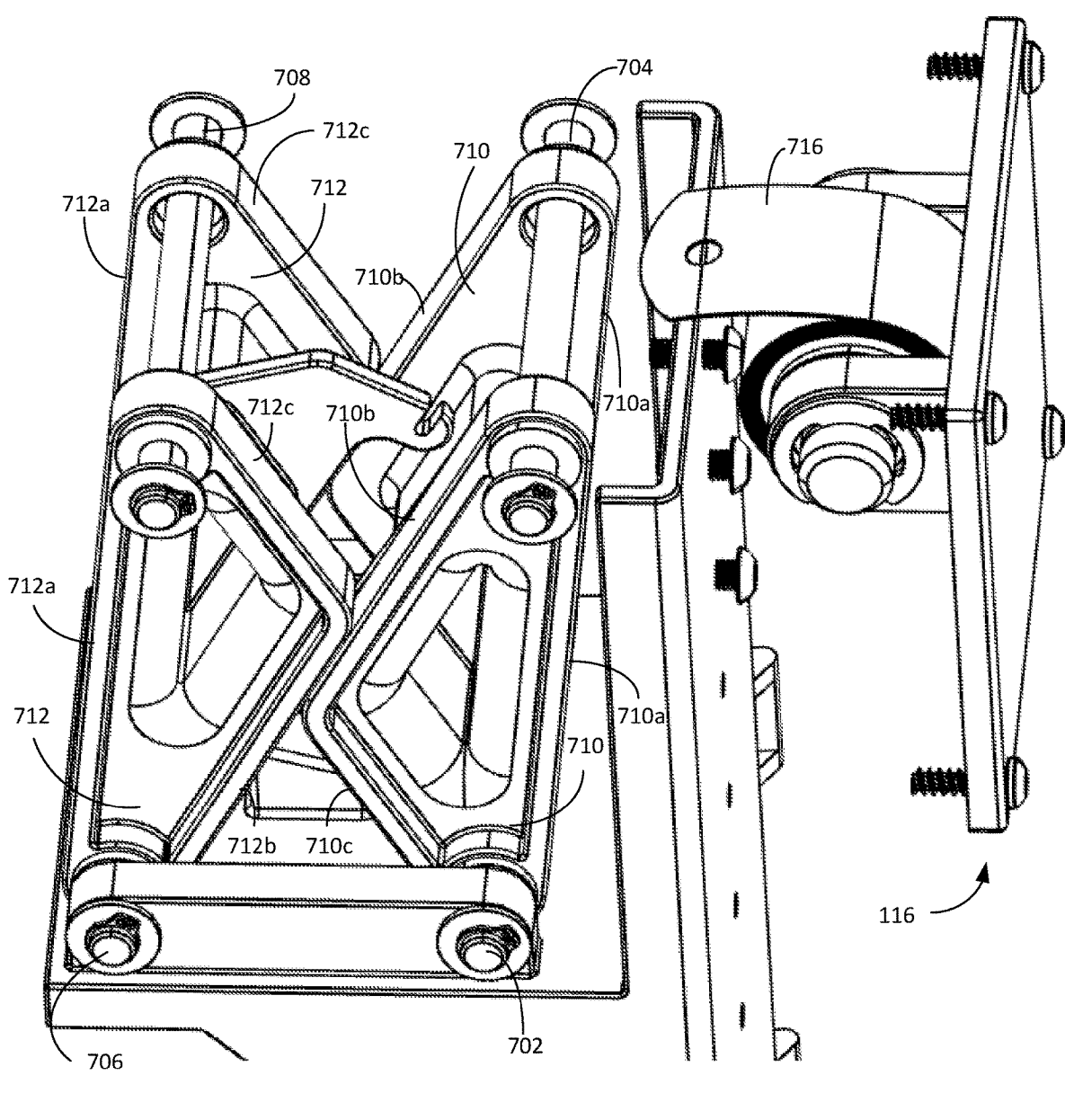
FIG. 8 illustrates a compliance mechanism according to an example.

FIG. 8 illustrates the compliance mechanism 124, as illustrated in FIG. 7, from an oblique, top-down angle according to an example. As FIG. 8 shows, the compliance mechanism 124 may be relatively wide, and thus multiple first links 710 and/or second links 712 may be present. In some examples, only one of each of the axles 702, 704, 706, 708 may be present. In some examples, the first links 710 may be coupled to one another (e.g., so that the first links 710 move in tandem with one another), and the second links 712 may be coupled to one another (e.g., so that the second links 712 move in tandem with one another).

Figure 9:
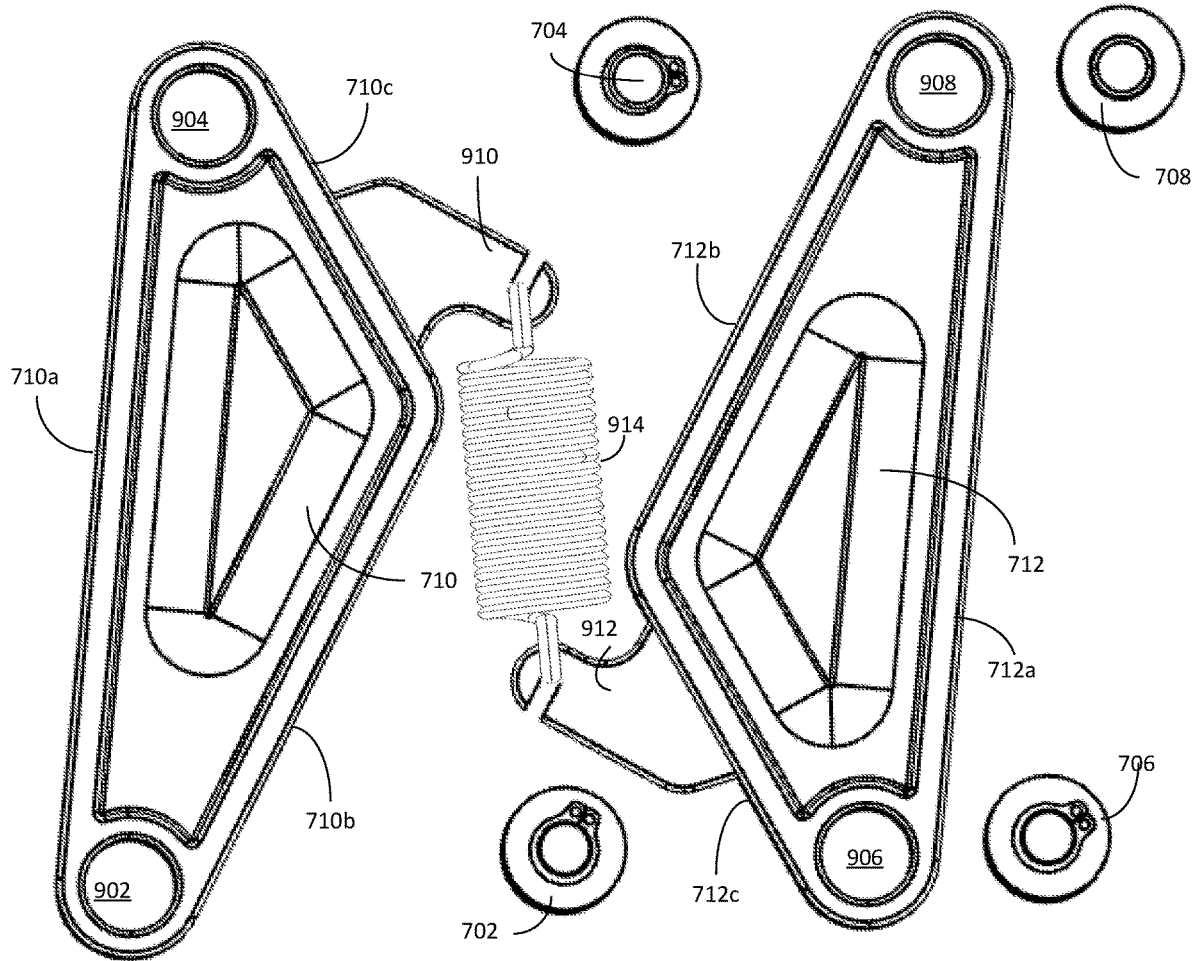
FIG. 9 illustrates a compliance mechanism according to an example.

FIG. 9 illustrates the compliance mechanism 124 in an exploded view according to an example. The first link 710 includes a first aperture 902 and a second aperture 904. The second link 712 includes a third aperture 906 and a fourth aperture 908. The first link 710 includes a first hook 910, and the second link 712 includes a second hook 912. FIG. 9 also illustrates a biasing element, e.g., spring 914.

The first aperture 902 is configured to receive and/or retain the first axle 702. The second aperture 904 is configured to receive and/or retain the second axle 704. The third aperture 906 is configured to receive and/or retain the third axle 706, and the fourth aperture 908 is configured to receive and/or retain the fourth axle 708.

The first hook 910 and second hook 912 are configured to receive and/or retain the biasing element 914 (e.g., a constant force and/or tension spring). Compared to the biasing element 116 of FIG. 1, a biasing element retained by the hooks 910, 912 is internal to the compliance mechanism 124. Other implementations of internal biasing elements are also possible, and it is not necessary to use hooks 910, 912. For example, internal spring-biased slides, and so forth, are also possible.

Figure 10:
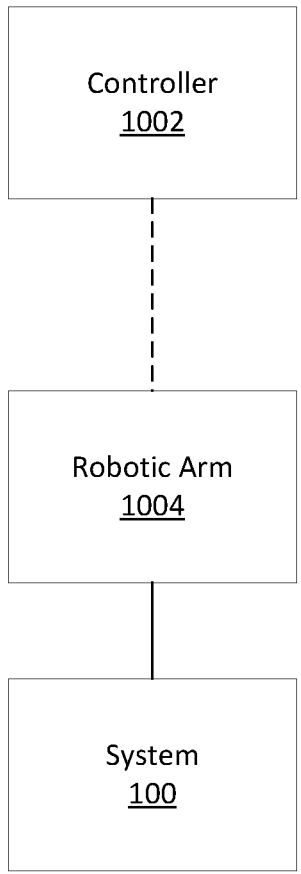
FIG. 10 illustrates an automated system for moving the compliance and protection system according to an example.

FIG. 10 illustrates an automated system 1000 for moving the system 100 into position according to an example. The automated system 1000 includes at least one controller 1002 ("controller 1002"), a robotic arm 1004, and the system 100 of FIG. 1.

The controller 1002 is communicatively coupled to the robotic arm 1004. The robotic arm 1004 is coupled to the system 100. In some examples, the robotic arm 1004 is coupled to the second chassis 118 of the system 100.

The controller 1002 is configured to control the movement and position of the robotic arm 1004 (e.g., by providing control signals to the robotic arm 1004). The robotic arm 1004 is configured to move the system 100 from position to position based on the control signals received from the controller 1002.

At times, the controller 1002 may control the robotic arm 1004 to move the system 100 such that the gladhand coupler system 102 (or other part of the system 100) experiences a force sufficient to move the compliance mechanism 124 from the first position to the second position or to another position. At times, the controller 1002 may control the robotic arm 1004 to move the system 100 such that the gladhand coupler system 102 (or other part of the system 100) experiences a force that exceeds the threshold force for which the bracket 110 is rated, causing the bracket 110 to break.

Although the controller 1002 may, at times, cause the system 100 to experience a force sufficient to engage the compliance mechanism 124 and/or to cause the bracket 110 to break, at times the controller 1002 will not be responsible for the force experienced by the system 100. For example, at times the trailer or tractor may move or some other external object may exert a force on the system 100.

Regardless of source, when a force is applied to the system 100 that causes the bracket 110 to break, the force exerted through the system 100 on the robotic arm 1004 may be relieved or minimized. For example, if the bracket 110 were not configured to break, a force applied to the gladhand 100 could be translated through the other components of the system 100 (e.g., through second chassis 118 to the robotic arm 1004, thereby causing the robotic arm 1004 to experience a force. A sufficiently great force may damage the robotic arm 1004, and forces applied at certain angles relative to the longitudinal axes of the robotic arm 1004 may be more prone to damage the robotic arm 1004 than forces applied at other angles. Thus, the bracket 110 breaking may allow a force applied to the system 100 to be removed, thereby relieving the robotic arm 1004 of the force and protecting the robotic arm 1004 from damage (in addition to protecting the gladhand coupler system 102 from damage).

The controller 1002 may also use the tags 106, 108 to perform scene analysis, position estimation and other related functions. As mentioned with respect to FIG. 1, the tags 106, 108 may be used to estimate the relative position of the system 100 and compliance mechanism 124. In some examples, the controller 1002 may estimate the relative position of the EOT 101. In various examples, the relative positions discussed above are determined with respect to the position of the at least one sensor 122.

The first tag 106 may face the at least one sensor 122 such that a largest face of the first tag 106 is facing the at least one sensor 122. The face of the first tag 106 facing the at least one sensor 122 may contain an easily identifiable marking (such as a QR code or other pattern). The at least one sensor 122 may provide stereo images of the first tag 106 to the controller 1002. The controller 1002 can then estimate the position of the compliance mechanism 124 based on the size of the first tag 106 in the images and the position of the first tag 106 in the images. For example, if there is no motion, the size and/or position of the first tag 106 in a first frame and in a subsequent frame may be unchanged, thus indicating no relative motion. If there is motion, the size and/or position of the first tag 106 in a first frame and in a subsequent frame may change, thus indicating relative motion. Thus, the controller 1002 may determine that relative motion has not occurred where there are no or minimal changes between frames and the controller 1002 may determine that relative motion has occurred when there is a more significant change between frames.

In some examples, such as when the at least one sensor 122 is a LIDAR, ultrasonic sensor, laser range finder, or other type of sensor capable of detecting distance directly, the distance to the tag 106, 108 may be determined directly and motion may be inferred from changes in the distance measured.

The second tag 108 may be orthogonal to the first tag 106, such that the largest face of the second tag 108 is orthogonal to the largest face of the first tag 106. The largest face of the second tag 108 may bear an easily identifiable marking (such as a QR code or other pattern or fiducial), and may be visible to a at least one sensor or at least one sensors situated on the robotic arm 1004 or in another position where the lens of said at least one sensors face the largest face of the second tag 108. Those at least one sensors may provide images of the second tag 108 to the controller 1002. The controller 1002 may use those images to estimate the relative position of the compliance mechanism 124 based on the position (e.g., in the frame) of second tag 108 in the images. For example, with respect to the second tag 108, as the compliance mechanism 124 experiences greater force along the Y-axis, thus causing the compliance mechanism 124 to shift in the Y-direction (e.g., to the right in FIG. 1), the second tag 108 will tend to move the same amounts in the same directions as the compliance mechanism 124.

Figure 11:
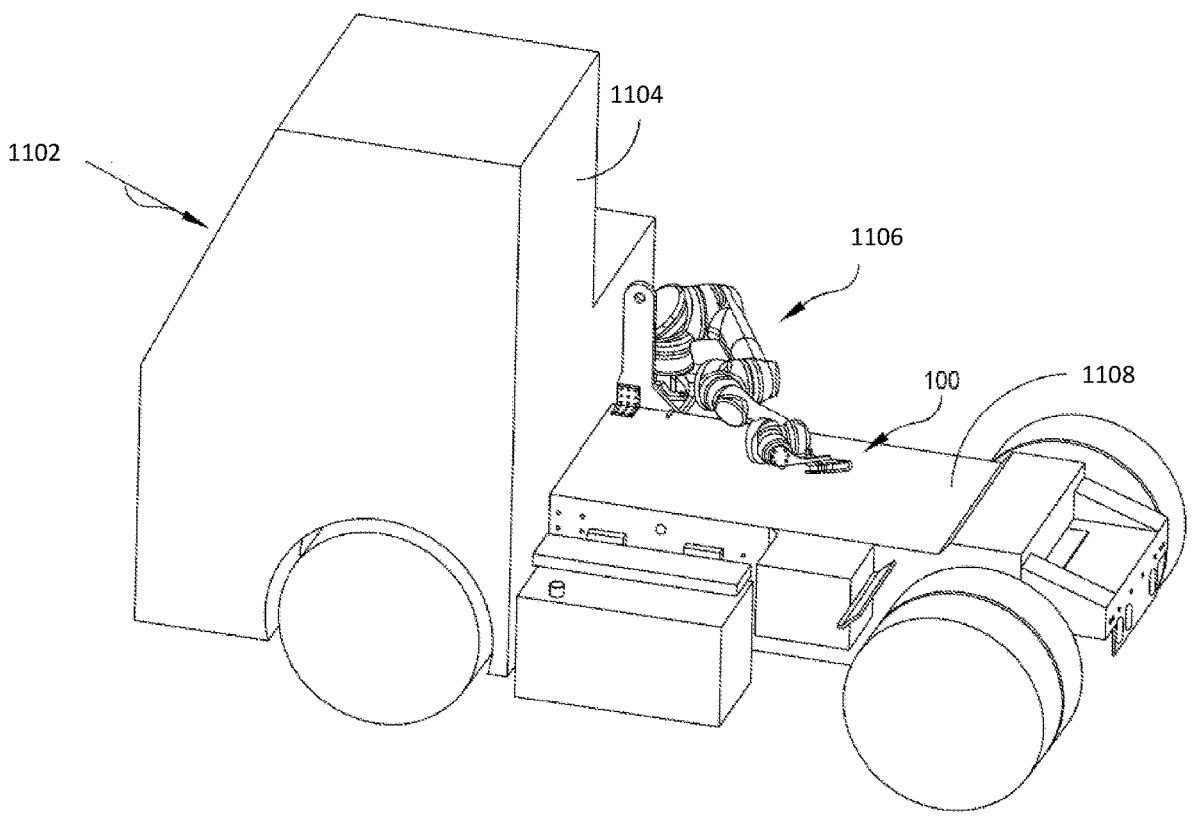
FIG. 11 illustrates a tractor with a robotic arm according to an example.

FIG. 11 illustrates an automated system 1100 ("system 1100") where one possible embodiment of the system 100 is shown to be connected to a robotic arm 1106, with the robotic arm being connected to the back of a tractor 1102. The tractor 1102 may be a yard tractor, like those used to move trailers within distribution facilities, ports, and so forth, or any other type of tractor unit. It will be understood that any means of moving the system 100 to achieve an engaged or mating position with a gladhand coupler, such as a different type of robot, a person, or any other automated, semi-automated, or non-automated means, may also be used. The robotic arm 1106 or equivalent may be configured to allow the system 100 to avoid any obstructions or hazardous areas, the backside of the tractor's cab 1104, the tractor bed 1108, or elsewhere around the system 100. It will also be appreciated that the robotic arm 1106 or equivalent may also be autonomous, semi-autonomous, or manually operated. It will be further appreciated that the robotic arm 1106 or equivalent need not be connected to the back of the tractor 1102, but may be connected to other parts of the tractor 1102, or to other mobile or immobile platforms, including—but not limited to—other cars or trucks, cranes, the ground, or any other appropriate place.

It will also be understood that the robotic arm 1106 or equivalent may be configured to release the system 100 after coupling the system 100 to a gladhand coupler located on a trailer that is to be moved by the tractor.

Figure 12:
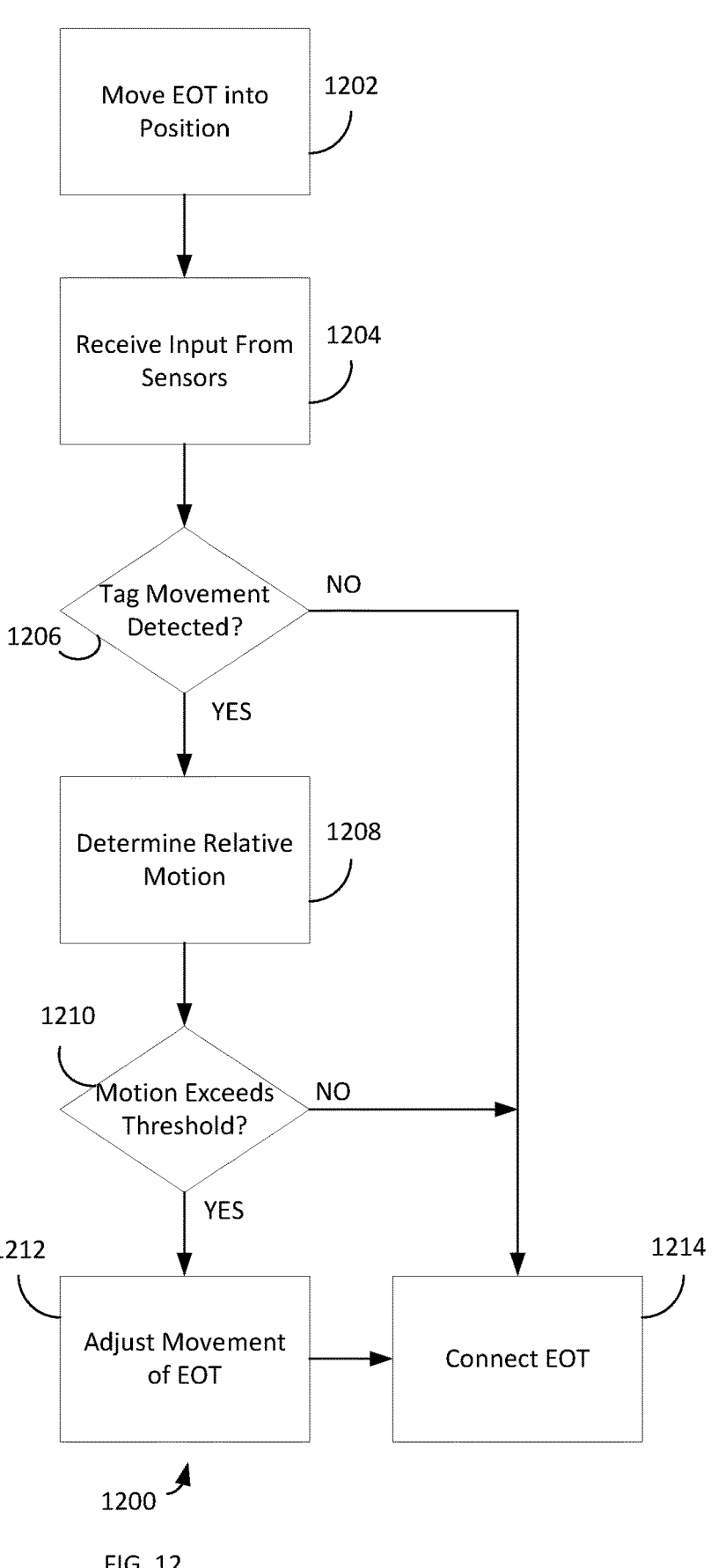
FIG. 12 illustrates a process for moving a tool into position while using the compliance and protection system.

FIG. 12 illustrates a process 1200 for operating an automated mechanism incorporating a robotic arm, based at least in part on estimating a relative displacement of a part of the robotic arm and/or related system according to an example. The process 1200 involves the controller 1002 detecting relative motion of the EOT 101 and adjusting the behavior of the robotic arm based on the relative motion of the EOT 101.

At act 1202, the controller 1002 controls the robotic arm to move the EOT 101 into position. For example, the controller 1002 may control the robotic arm to move a gladhand coupler system 102 attached to the EOT 101 toward a gladhand coupler on a tractor or trailer. The process 1200 may then continue to act 1204.

At act 1204, the controller 1002 receives input from the at least one sensor 122, for example, a sequence of images or a sequence of point-clouds or other type of input indicative of the position of at least one tag 106, 108. The process 1200 may then continue to act 1206.

At act 1206, the controller 1002 analyzes the inputs received from the at least one sensor 122 to determine whether the EOT 101 has moved relative to the sensor, e.g., whether the position of at least one tag 106, 108 has changed relative to the at least one sensor 122. For example, and discussed above, if the inputs provided by the at least one sensor 122 to the controller 1002 are images, the controller 1002 may determine that a size of the tag 106, 108 in the images has increased over time from the earlier images to the later images in the sequence (relative to the at least one sensor 122), and thus the EOT 101 is moving relative to the at least one sensor 122. On the other hand, if the size of the tag 106, 108 in the images has not changed, the controller 1002 may determine that the EOT 101 is not moving. If the controller 1002 determines that the EOT 101 is moving (1206 YES), the process 1200 may then continue to act 1208. If the controller 1002 determines that the EOT 101 is not moving (1206 NO), the process 1200 may then continue to act 1214.

At act 1208, the controller 1002 determines the relative motion of the EOT 101 with respect to the at least one sensor 122. For example, the controller 1002 may consider factors like the size of the tags 106, 108, the number of frames (e.g., images or point-clouds, and so forth) over which a change in the size of the tags 106, 108 occurs relative to the at least one sensor 122, and so on. The controller 1002 may determine if the relative motion of the EOT 101 is occurring at a speed that exceeds a threshold speed, may determine if the force causing the relative motion of the EOT 101 exceeds a threshold magnitude, may determine if the relative motion of the EOT 101 is in a given direction or directions, and so forth. The process 1200 may then continue to act 1210.

At act 1210, the controller 1002 determines if the relative motion of the EOT 101 exceeds a given threshold or set of thresholds. The threshold or set of thresholds may be chosen to be indicative of an undesirable condition, such as the EOT 101 moving too fast or experiencing too large a force, or moving in an undesirable direction, and so forth. If the controller 1002 determines that the relative motion exceeds the threshold or one or more thresholds of the set of thresholds (1210 YES), the process 1200 may continue to act 1212. If the controller 1002 determine that the relative motion does not exceed the threshold or one or more thresholds of the set of thresholds (1210 NO), the process 1200 may then continue to act 1214.

At act 1212, the controller 1002 controls the robotic arm to change the motion of the robotic arm such that the relative motion of the EOT 101 no longer exceeds a threshold or one or more thresholds of the set of thresholds. In some examples, the controller 1002 may control the robotic arm to move in a way that removes, alleviates, or minimizes the condition causing the undesirable relative motion of the EOT 101. In some examples, the controller 1002 may control the robotic arm to move slower or faster, to move in a different direction, to rotate, and/or so forth. The process 1200 may then proceed to act 1214.

At act 1214, the controller 1002 may control the robotic arm to connect the EOT 1214 to a tractor, trailer, or other target connection (e.g., the connect a gladhand coupler system 102 to a gladhand coupler).

The compliance mechanism 124 may be adjustable, such that the magnitude of the compliance of the compliance mechanism 124 may be changed (e.g., to accommodate different operating conditions). For example, a lighter weight system 100 or a less robust robotic arm may have a different compliance setting compared to a heavier or more robust system 100 or robotic arm. The compliance may be adjusted, therefore, to be set according to the maximum force (e.g., loads) the system 100 is expected to experience.

The compliance mechanism 124 may allow motion in one or more degrees of freedom (e.g., one or more directions). In some examples, the compliance mechanism 124 is designed to provide a greater degree of motion in one or more favored degrees of freedom, and relatively less motion in other degrees of freedom. The compliance mechanism 124 may be a linkage, a flexible material, a sliding mechanism, a pivoting mechanism, a rotating mechanism, or any other type of mechanism that allows motion in at least one degree of freedom.

Various controllers, such as the controller 1002, may execute various operations discussed above. Using data stored in associated memory and/or storage, the controller 1002 also executes one or more instructions stored on one or more non-transitory computer-readable media, which the controller 1002 may include and/or be coupled to, that may result in manipulated data. In some examples, the controller 1002 may include one or more processors or other types of controllers. In one example, the controller 1002 is or includes at least one processor. In another example, the controller 1002 performs at least a portion of the operations discussed above using an application-specific integrated circuit tailored to perform particular operations in addition to, or in lieu of, a general-purpose processor. As illustrated by these examples, examples in accordance with the present disclosure may perform the operations described herein using many specific combinations of hardware and software and the disclosure is not limited to any particular combination of hardware and software components. Examples of the disclosure may include a computer-program product configured to execute methods, processes, and/or operations discussed above. The computer-program product may be, or include, one or more controllers and/or processors configured to execute instructions to perform methods, processes, and/or operations discussed above.

Examples of the methods and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items.

References to "or" may be construed as inclusive so that any terms described using "or" may indicate any of a single, more than one, and all of the described terms. In addition, in the event of inconsistent usages of terms between this document and documents incorporated herein by reference, the term usage in the incorporated features is supplementary to that of this document; for irreconcilable differences, the term usage in this document controls.

Having thus described several aspects of at least one embodiment, it is to be appreciated various alterations, modifications, and improvements will readily occur to those skilled in the art. Such alterations, modifications, and improvements are intended to be part of, and within the spirit and scope of, this disclosure. Accordingly, the foregoing description and drawings are by way of example only.

What is claimed is:

1. A system for autonomously coupling a tractor and a trailer, comprising:
   a tool changer having a first part and a second part, the second part configured to detachably couple to the first part;
   a chassis coupled to the first part;
   an end-of-arm tooling (EOT) coupled to the second part;
   a compliance mechanism coupled between the chassis and the first part, the compliance mechanism being configured to allow relative displacement of the EOT with respect to the chassis, the compliance mechanism including a mechanical linkage and a biasing mechanism, the biasing mechanism being configured to apply a restoring force in a direction that opposes the relative displacement of the EOT with respect to the chassis.

2. The system of claim 1 further comprising a robotic arm coupled to the chassis, the robotic arm being configured to be coupled to a vehicle.

3. The system of claim 1 wherein the restoring force is approximately a linear function of the relative displacement.

4. The system of claim 1 wherein the biasing mechanism is a spring.

5. The system of claim 1 wherein the biasing mechanism is coupled to the chassis.

6. The system of claim 1 wherein the relative displacement permitted by the compliance mechanism is in a first translational degree of freedom.

7. The system of claim 1 further comprising at least one mechanical stop configured to limit the relative displacement of at least one part of the compliance mechanism.

8. The system of claim 1 further comprising at least one fiducial coupled to the EOT.

9. The system of claim 1 wherein the EOT includes a tool situated at an end of the EOT, the tool being configured to connect a trailer connection to a tractor connection.

10. A system for autonomously coupling a tractor and a trailer, comprising:
    a tool changer having a first part and a second part, the second part configured to detachably couple to the first part;
    a chassis coupled to the first part;
    an end-of-arm tooling (EOT) coupled to the second part; and a compliance mechanism coupled between the chassis and the first part, the compliance mechanism being configured to allow relative displacement of the EOT with respect to the chassis, the relative displacement permitted by the compliance mechanism being in a first translational degree of freedom, and the compliance mechanism constrains the relative displacement in at least one translational degree of freedom other than the first translational degree of freedom, or constrains the relative displacement in at least one rotational degree of freedom.

11. A system for autonomously coupling a tractor and a trailer, comprising:
    a tool changer having a first part and a second part, the second part configured to detachably couple to the first part;
    a chassis coupled to the first part;
    an end-of-arm tooling (EOT) coupled to the second part; and
    a compliance mechanism coupled between the chassis and the first part, the compliance mechanism being configured to allow relative displacement of the EOT with respect to the chassis, at least one destructible coupling mechanism coupled between at least a portion of the EOT and at least a portion of the chassis, wherein the destructible coupling mechanism is configured to break when a force exceeding a threshold force is applied to the destructible coupling mechanism, wherein the threshold force is less than a first force level that would damage the EOT or is less than a second force level that would damage a robotic arm coupled to the chassis.

12. The system of claim 11 further comprising a backup connection mechanism coupled to the EOT and to the chassis and configured to maintain a connection between the EOT and the chassis when the destructible coupling mechanism is broken.

13. A system for autonomously coupling a tractor and a trailer, comprising:
    a tool changer having a first part and a second part, the second part configured to detachably couple to the first part;
    a chassis coupled to the first part;
    an end-of-arm tooling (EOT) coupled to the second part;
    a compliance mechanism coupled between the chassis and the first part, the compliance mechanism being configured to allow relative displacement of the EOT with respect to the chassis; and
    at least one sensor configured to move in tandem with the chassis such that there is no relative motion between the at least one sensor and the chassis, the at least one sensor configured to sense at least one fiducial.

14. The system of claim 13 wherein the at least one sensor is a camera.

15. The system of claim 13 further comprising at least one controller, the at least one controller configured to receive input from the at least one sensor, the input reflecting a relative position of the at least one fiducial with respect to the chassis.

16. A robotic arm assembly comprising:
    an end-of-arm tooling (EOT) having an EOT chassis with a first end and a second end, and including a first fiducial coupled to the first end and a second fiducial coupled between the first end and the second end;
    an automated tool coupler having a first connector and a second connector configured to be selectively coupled together, the first connector coupled to the EOT and the second connector coupled to a compliance mechanism; and a chassis coupled to the compliance mechanism, the compliance mechanism being configured to allow relative displacement of the EOT with respect to the chassis.

17. The robotic arm assembly of claim 16 wherein the EOT further includes:

a tool coupled to the first end; and a destructible coupling mechanism coupled between the second end and the first connector.

18. The robotic arm assembly of claim 17 further comprising:

a second chassis coupled to the second connector and to the compliance mechanism between the second connector and the compliance mechanism; and at least one sensor coupled to the chassis and configured such that a plane of a lens of the at least one sensor is parallel to a plane of the first fiducial.

19. A system for preventing a catastrophic failure of a robotic arm, the robotic arm including a first section and a second section, comprising:

a breakaway mechanism configured to be coupled between the first section and the second section, the breakaway mechanism including a bracket coupled between the first section and the second section, the bracket being configured to break when a threshold force is applied to the second section;

an automated tool coupler coupled between the bracket and the second section, the automated tool coupler including a first connection coupled to the bracket and a second connection coupled to the second section; and a compliance mechanism including a mechanical linkage and a biasing mechanism, the biasing mechanism configured to apply a restoring force in a direction that opposes displacement of the automated tool coupler.

\* \* \* \* \*